Figure 1:
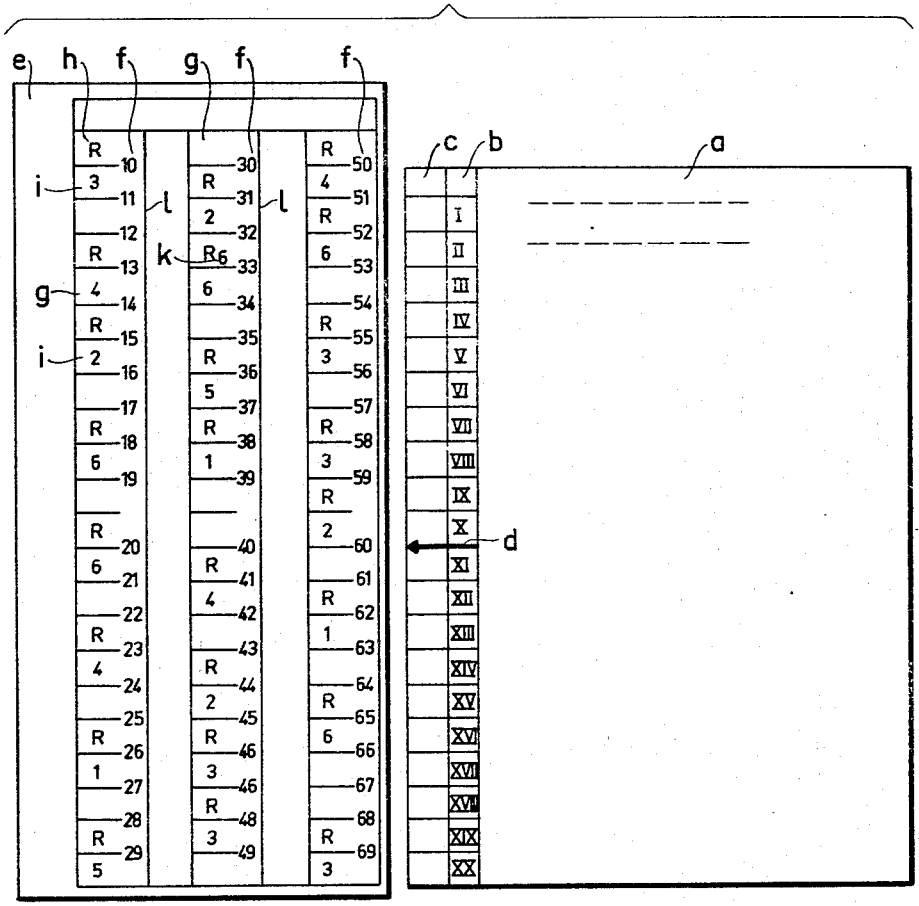

Oct. 18, 1966  S. A. JANSSON  3,279,099
LEARNING DEVICE WITH ANSWER CARD AND CHECKING CHART
Filed Oct. 26, 1964  3 Sheets-Sheet 3

United States Patent Office 3,279,099
Patented Oct. 18, 1966

---

3,279,099
LEARNING DEVICE WITH ANSWER CARD AND CHECKING CHART
Sven Axel Jansson, Lillkalmarvagen 27,
Djursholm, Sweden
Filed Oct. 26, 1964, Ser. No. 406,255
Claims priority, application Sweden, Oct. 30, 1963,
11,965/63
5 Claims. (Cl. 35—48)

The present invention relates to a rule for checking answers to questions comprising an answer card and a checking chart based on questions or problems enumerated with code signs, such as letters or figures (numerals). It is particularly useful as a learning device.

The new school has new demands on the teaching. The traditional class-teaching will to a great extent be replaced by teaching in groups or individually. Self-checking means giving the teacher facilities to current control without increase of the correcting burden will probably come into use more extensively than is the case at the present.

It is an object of the invention to provide for self-checking means of a unitary type comprising a correcting or checking chart useful for all subjects occurring in school. The problem with such charts has been that after some time the pupils have learned them by heart. The invention also has for its object to provide a simple combination of answer card and checking chart the design of which makes it too difficult, however, to remember the details of the checking chart and trace the answer directly without solving the question.

In order to obtain these objects and other valuable advantages that will be evident from the following description, the present invention provides a rule for checking answers to questions comprising an answer card and a check chart, said answer card being provided with, on the one hand, a row of marked limited areas adapted to receive in use of the rule answer code signs, each code sign comprising a reference sign and an answer sign, and, on the other hand with an index, said check chart being provided with a row of consecutive answer code signs of the kind referred to above, and in parallel therewith a row of right answer signs, such as an R, at given intervals and at each such right reply sign a reference sign of the kind referred to above, said answer card being adapted to be slid relative to said check chart with said rows in parallel, said index being located so as to cooperate with said row of code signs on said check chart during the sliding, and said limited areas and said right answer signs being located so that each of said limited areas register with one of said right answer signs only when said index registers with the code sign for right answer to the pertinent question.

In addition to the fact that the answer card has to be slid or displaced upward or downward relative to the check chart, there is also a kind of displacement on the answer card itself, inasmuch as the code sign for the answer to each successive question has to be placed in that one of said limited areas which is below the area already occupied by the code sign for the preceding question. According as the pupils answer to the questions they thus progress lower and lower down on the answer card. These two displacements render futile all efforts to learn the application of the checking chart by heart.

The learning device according to the invention can be used, on the one hand, in learning an item and, on the other hand, in the control or checking of knowledge acquired about the item in question, either by the pupil himself or by the teacher. In both cases confirmation is obtained immediately as to whether or not the answers are correct. Each question must be answered correctly before the pupil can continue, because before obtaining the total code sign pertaining to the answer to the next question the pupil has to acquire the reference sign of the code from the sign attached to the symbol (R) for right answer to the foregoing question. He then obtains the total code sign by adding to said reference sign the answer sign he chooses among the answers presented to the pertinent question. In case he gives a wrong answer the pupil can try again by choosing another of the answer signs presented. In this respect the present device distinguishes from other teaching machines on the market. Furthermore, in comparison with these it is less bulky and can be obtained at a low price.

The limited areas of the answer card according to the invention may consist of lines or squares arranged in columns, one presenting space for question signs, such as numerals, and one for code signs, such as letters or/and numerals. It is preferred that the index, such as an arrow, is located at a level about midway of the code sign column. The check chart may be provided with a guide line in parallel with the columns containing the code signs and the right answer signs for facilitating the displacement or sliding of the answer card along the check chart when the index is placed to register with a corresponding code sign on the checking chart.

The invention will now be described more in detail with reference to the attached drawings. In the drawings FIG. 1 illustrates an embodiment of an answer card and a check chart pertaining thereto.

Figure 2:
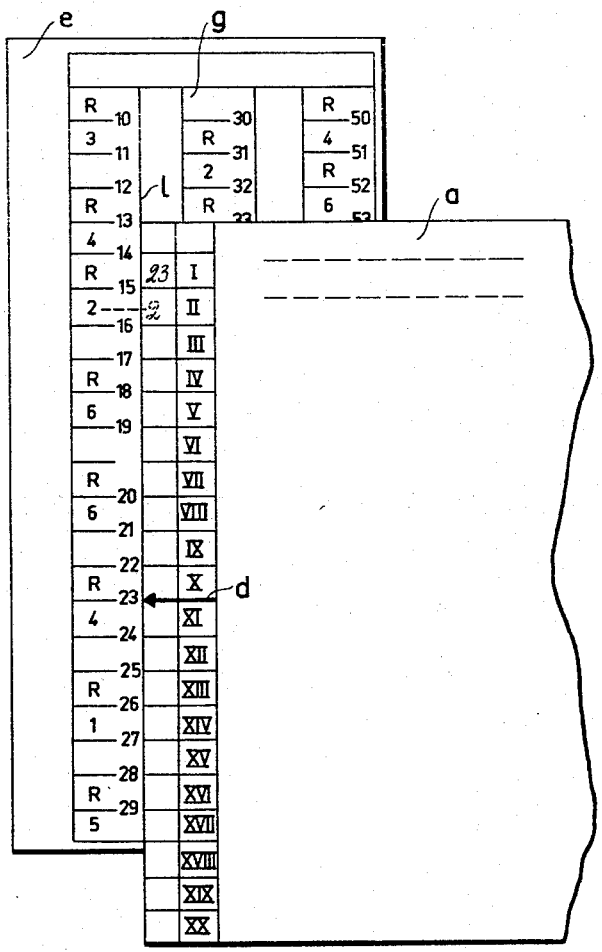
Figure 3:
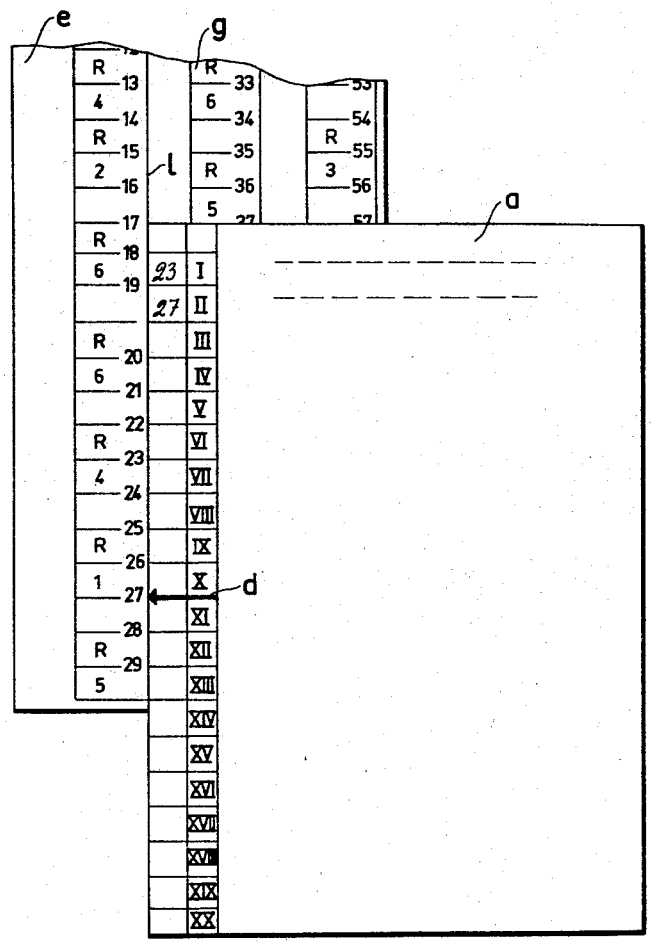

FIGS. 2 and 3 illustrate the use of the answer card and the check chart by way of examples.

The answer card $a$ has two columns provided with lines or compiled by squares, one column $b$ having limited areas for question signs, here Roman numerals, and one column $c$ for answer code signs, such as numerals, chosen by an answering pupil among a number of code signs relating to each question. On the answer card there is also an index $d$ in the form of an arrow, here located at the middle of the columns $b$ and $c$. The illustrated check chart $e$ is provided with three groups of columns, each group comprising two columns, the right hand colmun $f$ containing answer code signs of the type referred to inconnection with column $c$, such as numerals and the left hand column $g$ signs $h$ for right answer R and answer reference signs $i$. One such sign $i$ is entered below, or alternatively, for example, at the side of each R as indicated at $k$. At the right border of each group is a guiding line $l$ in parallel with the columns.

Instead of using two or more groups of columns one correspondingly longer double-column can be used, as, in fact, the groups are used only in order to get sufficient variation of combinations in a limited height of the chart. It is possible, of course, to use as answer code signs numerals of a limited sequence, such as 10–29, for all groups and give each group a particular sign, for instance a letter in a sequence of letters such as A, B and C.

In order to illustrate the use of the learning device the following example from a collection of examples may be given. The example comprises in this case three questions, with question signs I, II and III.

(I) What is the meaning of the center of gravity of a body?
 (20) The point where the gravity is.
 (23) The point where the force of gravity acts.
 (25) The point to which the gravity points.
(II) What causes the gravity of a body?
 (7) The body itself.
 (4) The earth.
 (5) The field of gravity of the earth.
(III) What can be said about the power of the field of gravity?

The field of gravity is
(2) more powerful at greater distance from the earth.
(1) less powerful at greater distance from the earth.
(5) equally powerful at all distances from the earth.

The answer signs are in this case numerals given within brackets at each of three alternative answers to each question. For the first question (I) the complete code sign comprising two figures is given, but for subsequent questions (II and III) only a singular figure, the answer sign proper of the code sign, is given. The failing figure for the tenth is to be found in the column of right answer and reference signs (numerals) in the check chart below (at) the symbol R for right answer to the preceding question. A pupil considering, for instance, that the code numeral 23 corresponds to correct answer to question I enters (FIG. 2) this numeral on the answer card in the square (limited area) in line with question I. He then puts the left edge of the answer card in alignment with the guiding line $l$ on the check chart and slides the answer card $a$ upward or downward along the guiding line $l$ until the arrow $d$ of the answer card registers with the code numeral 23 on the check chart, as illustrated in FIG 2. The square with numeral 23 on the answer card registers with a right answer sign R on the check chart $e$ which indicates correct answer to question I. In level with the question-II line of the answer card the check chart shows numeral 2. This numeral 2 corresponds to the failing numeral for the tenth of the complete answer code sign for question II, and the pupil writes 2 to the left in the square (limited area) at question II on the answer card. If the pupil now chooses, for instance, numeral 7 among the answer signs, i.e. among the singular figures 7, 4 and 5 of the answer numerals for question II he enters 7 to the right of the 2 in the square and the code numeral will be 27, as indicated in FIG. 3. When registering the arrow on the answer card with code numeral 27 on the check chart as illustrated in FIG. 3 the limited area, the square, housing numeral 27 registers with a blank square in the column for right answer signs indicating that the answer is wrong. The pupil tries again and he now chooses numeral 5 and gets code numeral 25. When registering the arrow with code sign 25 on the check chart, in the same way as illustrated in FIG. 2 the pupil finds that he now has given correct answer and obtains the reference sign for next question, namely the figure 6 for the tenth of question III. If he now chooses figure 1 among the available figures 2, 1 and 5 the code numeral will be 61 and the answer is correct. Generally correct answer is indicated only when the pertinent square in column $c$ registers with an R-square, registering with a blank square or a square with a figure indicating wrong answer.

The distribution of symbol R and numerals pertaining thereto may be done much at random, but in order to obtain a condensed system in which the check chart comprises a maximum of combinations it is preferred that about 4 (as 3 to 5) $R:s$ are allotted to a series of 10 numbers in column $f$. Numerals are chosen to each R according to the demand presenting itself according as the questions are worked out.

What is claimed is:
1. A rule for checking answers to questions comprising an answer card and a check chart, said answer card being provided with, on the one hand, a row of marked limited areas adapted to receive in use of the rule answer code signs, each code sign comprising a reference sign and an answer sign, and, on the other hand, with an index, said check chart being provided with a row of consecutive answer code signs of the kind referred to above, and in parallel therewith a row of right answer signs, such as an R, at given intervals and at each such right answer sign a reference sign of the kind referred to above, said answer card being adapted to slide relative to said check chart with said rows in parallel, said index being located so as to cooperate with said row of code signs on said check chart during the sliding, and said limited areas and said right answer signs being located so that each of said limited areas register with one of said right answer signs only when said index registers with that one of the code signs for alternative answers to the pertinent question which is the right answer.

2. A rule as claimed in claim 1, in which said index is located at about midway of said row of limited areas.

3. A rule as claimed in claim 1, in which the reference sign at each right answer sign is located below said right answer sign, so as to register with the limited area next below a limited area brought to register with said right answer sign.

4. A rule as claimed in claim 1, in which on said check chart said row of answer code signs is arranged close to said row of right answer signs to form a double column.

5. A rule as claimed in claim 4, in which said check chart comprises at least two parallel double columns of answer code and right answer signs.

References Cited by the Examiner

UNITED STATES PATENTS

| | | | |
|---|---|---|---|
| 1,892,318 | 12/1932 | Pressey | 35—48 |
| 2,863,226 | 12/1958 | Kelly | 35—48 |
| 2,936,532 | 5/1960 | Willey | 35—48 |
| 2,977,689 | 4/1961 | Rugland et al. | 35—48 |
| 2,983,052 | 5/1961 | Gainey | 35—48 |
| 3,224,116 | 12/1965 | DePue | 35—48 |

EUGENE R. CAPOZIO, *Primary Examiner.*